United States Patent [19]

Yasuda et al.

[11] Patent Number: 4,459,754
[45] Date of Patent: Jul. 17, 1984

[54] METHOD AND APPARATUS FOR MEASURING INTERIOR SHEAVE GROOVE DIMENSIONS

[75] Inventors: Kentaro Yasuda, Southington; Albert J. Saxer, Avon; Janis J. Cilderman, Simsbury, all of Conn.

[73] Assignee: Otis Elevator Company, Farmington, Conn.

[21] Appl. No.: 391,194

[22] Filed: Jun. 23, 1982

[51] Int. Cl.³ .............................................. G01B 3/10
[52] U.S. Cl. ..................................... 33/137 R; 33/179
[58] Field of Search ................... 33/137 R, 179, 178 R

[56] References Cited

U.S. PATENT DOCUMENTS 3,407,507 10/1968 Brubaker .............................. 33/179
4,332,087 6/1982 Ellis ................................... 33/137 R

FOREIGN PATENT DOCUMENTS 421864 1/1911 France ............................. 33/137 R Primary Examiner—William D. Martin, Jr.
Attorney, Agent, or Firm—Robert E. Greenstien

[57] ABSTRACT

A metal tape containing diameter graduations along the tape is wrapped around the groove in a sheave. The tape contains spaced apart supports which precisely position the tape at a certain depth in the groove. The intersection of the two ends of the tape indicate the diameter of the groove. The ends have vernier graduations.

4 Claims, 4 Drawing Figures

METHOD AND APPARATUS FOR MEASURING INTERIOR SHEAVE GROOVE DIMENSIONS

DESCRIPTION

1. Technical Field

This invention concerns methods and apparatus for measuring the circumference, depth and diameter of a groove in a grooved sheave, such as the sheaves used in elevator systems.

2. Background Art

In many applications, for example an elevator system, there is a need to measure the circumference of the cable supporting groove in the sheave that drives the cable. It is important in an elevator system, in particular, because that measurement provides an indication of groove wear. If, in a multicable system, some of the grooves are worn more than others, the rope that rides in the groove will wear excessively, due to slippage, as will the groove. Naturally, the measurement is also important when manufacturing and resurfacing the grooves, to assure that all grooves have the same diameter.

However, measuring the interior circumference of a groove in a sheave is not particularly easy. While the circumference of the sheave itself can be measured by tightly wrapping a metal tape around the outer edge of the sheave, that cannot be done in the groove, because it will not conform uniformly with the circular shape. Moreover, the measurement usually has to take place at some depth in the groove, and that, too, means that simple tape measurement would yield very inaccurate and, perhaps, entirely meaningless results.

Sophisticated electronic gauging can be used. But, that is both expensive, time-consuming and awkward, and, so, at least in the case of an elevator system, it is unacceptable.

DISCLOSURE OF INVENTION

According to the present invention, a nonstretchable, e.g. steel, graduated tape, preferably one having vernier graduations, is configured with groove conforming spacers. To measure the groove dimension, the tape is wrapped around the sheave with the spacers resting in the groove. The tape is pulled tight so that the spacers firmly seat in the groove. Dimensions of the spacers are established so that when the tape is tight, it rests at a certain depth in the groove, the depth at which the measurement is made. The measurement is read at the intersection of the tape ends, where they cross—indicating the circumference around the groove at that depth, or by suitably graduating the tape, indicating the diameter. The spacers are placed comparatively close to each other, so that the tape, when tigthened, is basically circular, thereby comforming with the circular shape of the sheave.

Hence, the present invention provides a very convenient, inexpensive technique which can be used in the field, as well as a manufacturing facility, for rapidly measuring the groove dimension at a certain depth.

BEST MODE FOR CARRYING OUT THE INVENTION

Figure 1:
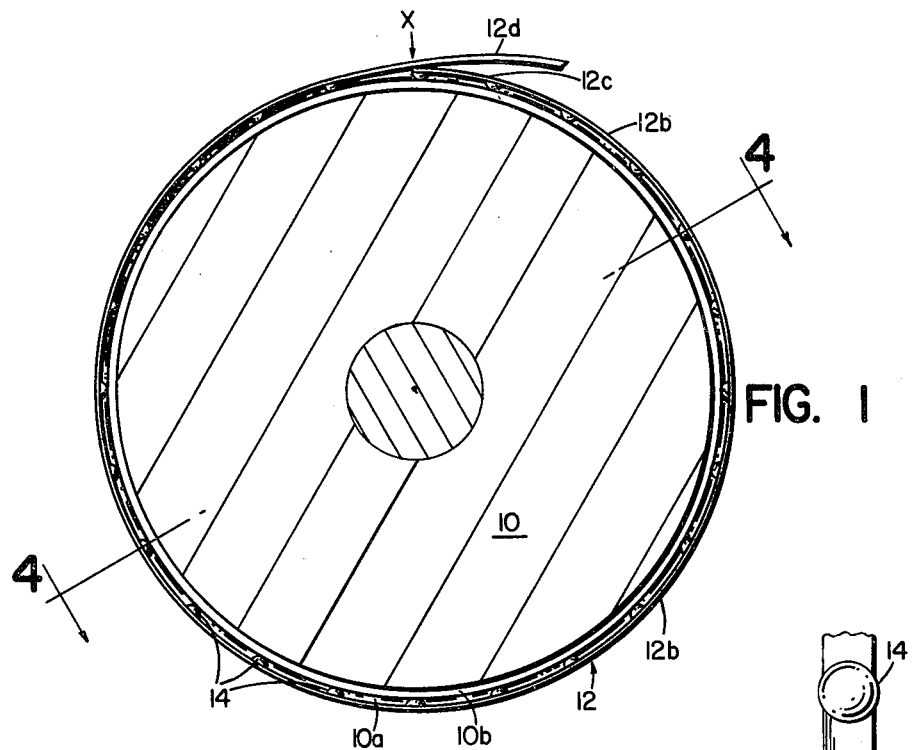
FIG. 1 is an elevated, sectional view of a sheave containing a groove; a groove measuring device, which embodies the present invention, is positioned in the groove, and the section is along a plane that is perpendicular to the axis of rotation.
Figure 2:
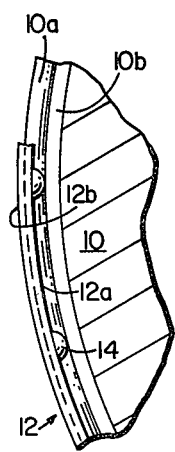
FIG. 2 is an expanded or enlarged view showing a portion of the perimeter of the sheave in FIG. 1.
Figure 4:
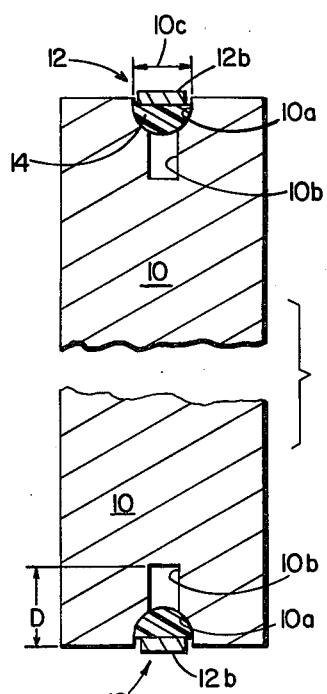
FIG. 4 is a sectional view of the sheave edge as seen in the direction 4—4 in FIG. 1.
Figure 3:
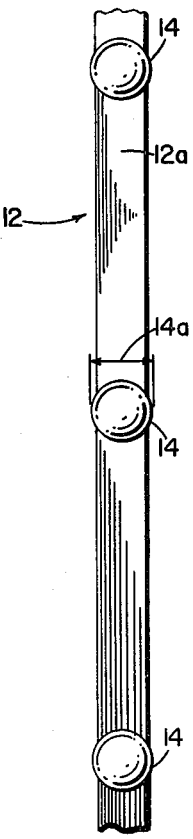
FIG. 3 is a plan view of the groove measuring device that is shown in FIG. 1.

FIG. 1 shows a traction sheave 10, which is used commonly in elevator systems. As FIG. 4 shows, the sheave contains a groove 10a, and this groove may include, as shown, an undercut", which improves traction. In an elevator system a hoist rope (a cable) fits in the groove 10a, which has a circular cross section to grab the rope firmly to provide good traction. The sheave is rotated to propel a car which is connected to the rope. In all systems there is more than one groove, because multiple ropes are used. All the grooves should have the same diameter.

The sheave 10 is sectioned in FIG. 1 to expose, for explanatory purposes, the groove 10a and the cut 10b and a measuring device 12, which is wrapped around the sheave in the groove 10a. The device consists of a graduated tape, preferably made of flexible steel. Hemispherical spacers 14 are located along one surface 12a of this tape and the spacers are spaced apart from each other along the tape's length. The spacers 14 are located on the side 12a of the tape that is opposite the side 12b containing the measurement graduations.

The diameter 14a of each spacer 14 is substantially the same as the width 10c of the groove 10a, at a certain distance D above the bottom of the groove. D is typically at the centerline of the rope, which is the position at which the groove diameter around the sheave needs to be measured.

The spacers should be set apart from each other so that, when the tape is wrapped around the sheave in the groove, it is substantially circular. This avoids errors in the measurement of the groove circumference that can arise if the tape is not circular when it is drawn tightly around the sheave. The distance D is determined by the cross section of the spacers. Because the cross section of the spacers and the groove are basically congruent, proper tape alignment is achieved throughout the groove at the desired groove depth for measuring the diameter.

In addition to having graduations along the outer surface 12b, the tape may have, at each end 12c, 12d, a portion that has vernier graduations (not shown) to obtain extremely precise measurement. The graduations may be in units that directly indicate the diameter. With the vernier it may be read to a thousandths of an inch because the diameter measurement is smaller by a factor of $\pi$, than the circumference.

To measure the diameter, the tape is wrapped tightly around the sheave, with the spacers in the groove 10. The measurement is taken where the two ends 12c, 12d intersect (the point X in FIG. 1). If a vernier graduation is utilized, the measurement can be made accordingly.

As the groove 10d wears with continued use, it will become deeper and deeper and its diameter will decrease. The present invention, in that context, is particularly useful for field service in elevator systems. The car can be blocked and the tension relieved from the ropes. The ropes may then be removed temporarily from the grooves. The measuring device, comprising the gradient tape 12 and the spheres 14, may then be successively wrapped around each groove to measure its diameter. If there are substantial differences between the diameters, then the grooves must be recut, which can be done in the field. One way is to measure, using the tape, the diameter of the largest and smallest grooves and cutting all the grooves so that they have the diameter of the smallest groove. A tool may be fixed in place and pressed into the groove as the sheave is rotated by the elevator machine (motor). The groove is cut down a certain distance, which may be indicated by graduations on the cutting tool that reflect groove depth. The cutting tool, of course, is semicircular so as to provide the right cut. Thus, using the tape, if the largest groove is, for example, two thousandths of an inch greater in diameter than the smallest groove, two thousandths should be removed from the groove, as indicated on the cutting tool graduations. Clearly, the invention thus provides a very convenient and reliable field performable technique for spotting and repairing worn sheaves in elevator systems.

The method and the device of the invention may also be used in the fabrication of the sheave. There, too, it provides a very inexpensive, quick way to determine if the grooves are the same.

Variations in the device are possible. The spacers 14 do not have to be hemispherically spaced as shown (to have a semicircular cross section). To the extent that the groove may have a different shape (for example V-shaped), they should have a cross section which is also V-shaped, to fit in the groove correctly. Their width 14a is selected to determine the point where the diameter is measured. In the example that has been discussed, the measurement is made near the outer edge of the groove, which is approximately the rope's centerline. But the measurement could be made at a lower depth.

As explained, it is important that, when wrapped on the sheave, the tape is as circular as possible. By adding more spacers 14, it becomes more circular. (The straight-line segments between the spacers are shorter.) The number of spacers should be selected by considering the precision desired in measuring the circumference. If relative changes are primarily important, e.g. to decide on groove wear, then absolute accuracy is not as important as relative accuracy. But, to check manufacturing quality, absolute accuracy may be equally important.

The spacer 14b could be cylindrical, rather than hemispherical. A cylindrical shape would still have a semicircular cross section to match the groove cross section. But, cylindrically shaped spacers 14 should be rather short to maintain a near circular tape shape. The hemispherical shape that is shown is considered, as a result, to be the optimum arrangement, providing the right cross-sectional dimensions without taking up too much linear space, while also having enough surface area so that the spacer can be reliably secured to the tape. Indeed, the spacer could be a "slice" of the hemisphere 14, but then its attachment to the tape may be difficult. Using a hemisphere makes it possible to glue or rivet it to the tape. If the spacers are a slice, gluing may be the only way to attach the spacers. But, that may not be secure, however, because of the small surface area between the tape and the spacer. Hence, the hemisphere is preferred.

Other modifications, variations and alterations may be possible for one skilled in the art based upon the explanation that has been provided of the preferred embodiment of the present invention.

We claim:

1. A device for measuring a groove dimension in a grooved sheave, characterized by:
   a length of thin tape which contains graduations along its length; and
   spacers which are spaced apart along one surface of the tape for supporting the tape in the groove, each spacer having a cross-sectional contour which is congruous with the groove at a certain predetermined groove depth at which the measurement is to be made.

2. A device according to claim 1, characterized in that the spacers are substantially hemispherical.

3. A method for obtaining a dimension of a grooved sheave, characterized by the steps:
   (a) beginning with one of two ends of a length of thin graduated tape, comprising spacers which are located along one surface of the tape for supporting the tape in the groove, each spacer having a cross-sectional contour which is congruous with the groove at a certain predetermined groove depth, wrapping the tape 360° around the entire circumference of the groove so that one end intersects with a portion of the tape that is not wrapped around the groove;
   (b) holding the tape so that each spacer registers with the groove; and
   (c) reading a graduation on the tape where the one end of the tape and the unwrapped portion intersect.

4. A method for servicing a multigrooved sheave, characterized by the steps:
   (a) measuring the diameter of each groove;
   (b) reducing the diameter of each groove to the smallest measured diameter by rotating the sheave and guiding a cutting tool into the groove for a depth that equals the difference between the smallest diameter and the diameter of the groove;
   said step (a) comprising:
   (c) beginning with one of two ends of a length of thin graduated tape, comprising spacers which are located along one surface of the tape for supporting the tape in the groove, each spacer having a cross-sectional contour which is congruous with the groove at a certain predetermined groove depth, wrapping the tape 360° around the entire circumference of the groove so that one end intersects with a portion of the tape that is not wrapped around the groove;
   (d) holding the tape so that each spacer registers with the groove; and
   (e) reading a graduation on the tape where the one end of the tape and the unwrapped portion intersect.

* * * * *

UNITED STATES PATENT AND TRADEMARK OFFICE
CERTIFICATE OF CORRECTION

PATENT NO. : 4,459,754

DATED : July 17, 1984

INVENTOR(S) : Kentaro Yasuda; Albert J. Saxer; Janis J. Cilderman

It is certified that error appears in the above-identified patent and that said Letters Patent is hereby corrected as shown below:

Column 2, Line 13, "an undercut"" should read —an "undercut"—.

Column 2, Line 57, "10" should read —10a—.

Column 2, Line 61, "10d" should read —10a—.

Signed and Sealed this

Ninth Day of April 1985

[SEAL]

Attest:

DONALD J. QUIGG

*Attesting Officer*     *Acting Commissioner of Patents and Trademarks*